March 9, 1954     I. SHUR     2,671,257
SLIDER-OPERATED SEPARABLE FASTENER
Filed May 4, 1951
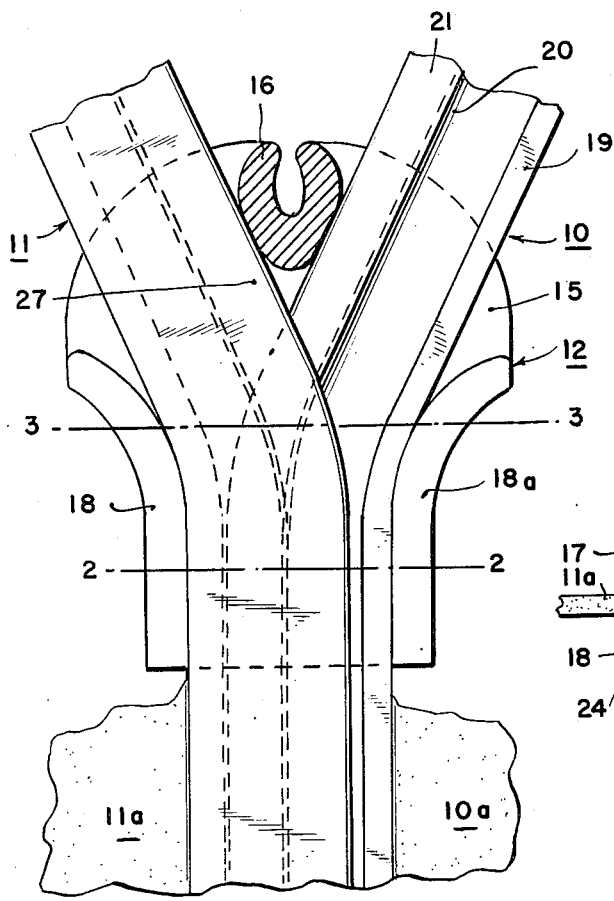
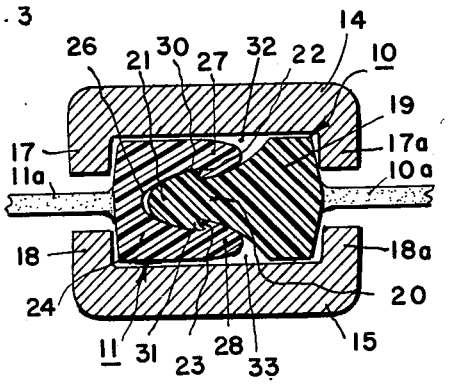
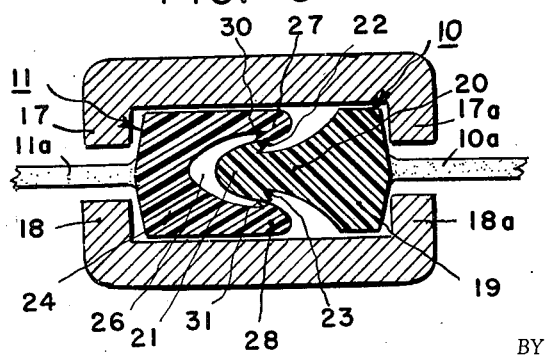
INVENTOR
IRA SHUR,
BY
ATTORNEY Patented Mar. 9, 1954

2,671,257

UNITED STATES PATENT OFFICE 2,671,257

SLIDER-OPERATED SEPARABLE FASTENER

Ira Shur, Bayside, N. Y., assignor to Waldes Kohinoor, Inc., Long Island City, N. Y., a corporation of New York Application May 4, 1951, Serial No. 224,535

1 Claim. (Cl. 24—201)

This invention relates to improvements in slider-operated separable fasteners, and more particularly to an improved separable fastener of the class in which the inter-engaging fastener parts consist of continuous flexible strips which fasten with one another in an uninterrupted manner throughout their full length, as distinguished from the more usual slider-operated fastener employing individual fastener elements disposed in oppositely facing rows.

A general object of the present invention is the provision of a slider-operated separable fastener as aforesaid which is superior to known fasteners of this class in its ability to provide an uninterrupted and continuous fastening throughout its length, in the manner in which the strips hold together against forces tending to separate them, and in being capable of operation by a conventional Y-shaped slider comprising front and rear wings, etc., as used with slide fasteners employing the individual fastener elements as aforesaid.

A more specific object of the invention is the provision of a separable fastener characterized by inter-engaging parts in the form of continuous flexible strips adapted to be brought into mating engagement, wherein the male part is adapted to be engaged with the female or socket part with a snap action, and thereupon maintained engaged by pressure developed within the female or socket part and which is inherent in its construction.

Another aim of the invention is the provision of a separable fastener composed of continuous strips provided with mating means as aforesaid, wherein said mating means include hook-like engaging portions which complement one another so as to form a connection which tightens rather than loosens under lateral forces tending to separate the strips.

Yet another object of the invention is the provision of a separable fastener as aforesaid, wherein the strips are so shaped and dimensioned that they can be engaged and disengaged by a conventional slider of the type used to operate slide fasteners employing individual fastener elements arranged in opposite row formation, and so as to insure smooth operation of the slider as well as to prevent jamming thereof.

Other objects and advantages of an improved separable fastener characterized as in the foregoing will be apparent from the following detailed description, taken with the accompanying drawings, in which:

Fig. 1 is a front view of a slider-operated separable fastener according to the invention shown as partially opened by its slider, the front wing of which is removed;

Fig. 2 is a section taken through the slider and fastener on a line corresponding to line 2—2 of Fig. 1; and Fig. 3 is a section similar to Fig. 2 taken on a line corresponding to line 3—3 of Fig. 1.

Referring to the drawings, a slider-operated separable fastener according to the invention consists of three parts, namely, two elongated strips 10, 11, and a slider 12 for engaging said strips when actuated therealong in one direction (usually upwardly), and for disengaging the strips when actuated in the opposite direction. In their manufacture, the aforesaid strips may be formed with integral tapes 10a, 11a, respectively, which are adapted to be fastened to the edges of an opening in a garment, pouch, handbag or similar article in any approved manner; for example, by the application of heat and pressure. Preferably, the strips 10, 11 and their tapes 10a, 11a are made from rubber, rubber-like or plastic material (neoprene, polyvinyl, nylon or the like) capable of being extruded, and they are produced to desired length by any one of the known extrusion procedures suitable to their production.

The slider 12 may be and preferably is of the Y-shaped type conventionally employed to operate slide fasteners of the class wherein a plurality of individual metal fastener elements are clamped in oppositely facing longitudinal rows along the edges of fabric tapes. As illustratively shown, such a slider comprises front and rear wings 14, 15 (Figs. 2 and 3) which are secured in spaced parallel relation by a neck 16 (Fig. 1) which also functions as a divider. The slider wings are provided as usual with facing side flanges 17, 17a and 18, 18a, respectively, which cooperate with the neck or divider to define a Y-shaped channel having generally rectangular section, at least in its vertical leg portion, and uniform depth throughout its length.

Being adapted for operation by a conventional slider aforesaid, it is a feature of the invention that the strips 10, 11 are so shaped and dimensioned that they can be mated and disengaged by a conventional slider as aforesaid and that the slider may be actuated smoothly and without jamming in both fastener closing and opening directions. To this end, the strip 10, which forms the male part of the fastener, has a body portion 19 of thickness substantially equaling the depth of the slider channel, being defined on three sides by parallel front and rear faces and by right-angular outer edge faces corresponding, respectively, to the inner faces of the front and rear wings 10, 11 and of their side flanges 17a, 18a. Extending inwardly from said body portion and integrally connected thereto by a narrow depth web or neck portion 20 defined by converging surfaces extending along opposite curvatures is a rib 21 which in vertical section (Figs. 2 and 3) is shaped somewhat as an arrowhead or stud disposed symmetrically to the sides of the transverse median plane of the strip 10. In addition to being shaped generally as a stud as aforesaid, the under surfaces 22, 23 of the rib by which its widened base portion is offset from the neck portion 20 are oppositely inclined and extend at an acute angle from said median plane. Thus, the surfaces 22, 23 provide inclined shoulders which overhang the neck surfaces into which they connect, similar to the barbs of a hook.

The companion strip 11 comprises a body portion 24 corresponding in thickness and shape to the body portion 19 of the strip 10; that is to say, it has plane front and rear faces spaced the depth of the slider channel and outer side-edge faces at right angles thereto, with the result that said body portion fills the depth of the channel with suitable sliding clearance. Along its inner side edge, the companion or female strip 11 is provided with a longitudinally extending channel 26 forming a socket for the rib 21 and which is accordingly shaped in cross section complementally to the aforesaid section of the rib. As best seen in Fig. 3, the portions of the strip 11 which define the mouth of the socket 26 are shaped as facing hooks 27, 28 whose bills point toward the strip 10 and are provided with overhanging barbs whose under surfaces 30, 31 are oppositely inclined and disposed at complemental angles to that of the inclination of the shoulder surfaces 22, 23, respectively, of the male rib 21.

As seen in Fig. 2, the overall width of the strips 10, 11, when mated, corresponds to the width of the slider channel in its vertical leg portion as such width is measured between the inner faces of the slider side flanges 17, 17a and 18, 18a. As the depth of the body portions 19 and 24 of the strips corresponds to the depth of the channel as measured by the spacing between the slider wings, it will be observed that, when mated, the strips substantially fill said vertical channel leg. The aforesaid dimensioning and shaping of the strips thus not only results in the strips being forced together and mated by pressure of the side flanges defining the vertical leg portion of the slider channel as the slider is actuated along the strips in fastener-closing direction, i. e. upwarly in Fig. 1, but also insure proper guidance of the strips prior to their mating and during their disengagement.

According to further special features of the invention, the hooks 27, 28 and the walls or shanks by which they are connected to the body portion 24 of the female strip 11 are slightly inclined towards one another an amount such that the hooks normally define a mouth opening which is narrower than the widened base portion of the rib 21, whereby the outer surfaces of the hooks and their shanks, instead of extending in continuation of the plane front and rear faces of the body portion 24, are slightly tapered so as to converge inwardly therefrom, i. e. toward the transverse median plane of the strip. As seen in Fig. 2, such results in the formation of clearance spaces 32, 33 between the aforesaid hooks 27, 28 and the corresponding under faces of the slider wings.

The purpose of these clearance spaces will be apparent from a comparison of Figs. 2 and 3, of which Fig. 3 illustrates the relationship of the hooks of the female strip 11 and the rib 21 of the male strip either during their engagement or disengagement. Assuming that the strips are being engaged in Fig. 3, it will be seen that the stud-like rib 21 of the male strip is entering the socket 29 of the female strip. Due to the aforesaid inclination of the hooks 27, 28 and their shanks, as results in the mouth of the socket being smaller than the thickness dimensions of the rib 21 and neck 20, the hooks 27, 28 must spread outwardly to permit entry of the rib 21. Such spreading movement is permitted by the aforesaid clearance spaces 32, 33 which enables the hooks to be spread over the wide or base-end of the rib while staying within the substantially rectangular contour of the strips, and hence without exerting undue pressure on the under faces of the slider wings as might cause the slider to jam or to operate with less than the desired degree of smoothness. The aforesaid clearance spaces 32, 33 also permit the hooks 27, 28 of the female strip to spread when the strips are being disengaged by the divider 16 in the downward or fastener opening movement of the slider, also without interference to slider operation.

The described inclination of the hooks 27, 28 and their shank portions is of distinct advantage in causing the rib 21 of the male strip 10 to seat in the socket 26 of the female strip 11 with a snap action. It is also to be observed that when the rib is fully seated, as in Fig. 2, the aforesaid hooks, due to their elasticity, tend to snugly embrace between them the rib 21 and the neck portion 20 of the male strip, with the result that the strips when mated provide an uninterrupted, sealed closure for their entire length. Moreover, due to the complemental disposition of the under surfaces 30, 31 of the hook barbs and the inclined shoulder surfaces 22, 23 of the rib 21, any force tending to separate the engaged strips acts, instead, to tighten their engagement up to a certain limit, so that for all normal usage a secure fastening results.

Without further analysis, it will be appreciated that a separable fastener as described achieves the desirable objectives therefor outlined in the foregoing. It provides a very tight and in fact sealed closure throughout its full length having numerous advantages as compared to the conventional slide fastener employing individual metal fastener elements. Moreover, when considered in transverse section, the improved fastener approximates the form of a stud and socket fastener, but with opposite portions of the socket exerting resilient pressure on the stud from both sides thereof. When such a fastener is developed to have linear dimension as is the present fastener, it becomes obvious that the stud element having longitudinal rib form is gripped from both sides, i. e. from above and below, giving to the slider added securement not found in prior fasteners of the same class. The present separable fastener construction also has the advantage that it may be operated by a conventional slider providing sure and proper guidance of the strips during their engaging and disengaging action.

As many changes could be made in carrying out the above constructions without departing from the scope of the invention, it is intended that all matter contained in the above description or shown in the accompanying drawings shall be interpreted as illustrative and not in a limiting sense.

I claim:

A slider-operated separable fastener comprising two elongated strips of flexible material having complemental fastening means provided along their adjacent side edges and a slider for progressively engaging and disengaging said fastening means, said slider having plane front and rear wings provided with right-angularly disposed side flanges and a divider which cooperate to define a Y-shaped channel having uniform rectangular section in its vertical leg portion, said strips each including a body portion having depth corresponding to the depth of the channel and being defined by plane front and rear faces and right-angularly disposed outer side edges, the overall width of the strips upon engagement of their fastening means corresponding to the width of the vertical leg portion of the channel, said fastening means including a longitudinally extending rib projecting from the inner side edge of one strip and being connected thereto by a narrow neck, the rib having studlike section providing a base portion of width substantially less than the thickness of the body portion of said strip and which is connected to the neck portion by acutely angled surfaces defining overhanging shoulders, and a longitudinally extending and substantially complementally shaped socket for said rib formed in the body portion of the other strip and opening through the adjacent side edge thereof, the mouth of said socket being defined by facing hooks connected to the body portion of said other strip by shank portions and being provided with barbs adapted to engage beneath the overhanging rib shoulders upon seating of the rib in said socket, said shank portions being inclined towards each other by an amount such that said hooks are normally spaced apart a distance which is less than the base portion of the rib and being spreadable by the rib upon movement of the latter into the socket under the constrictive force applied against the outer side edges of the body portions of said strips through engagement therewith of the side flanges of the vertical leg portion of the slider consequent to movement of said slider in fastener closing direction, the inclination of the hooks further providing clearance space outwardly thereof but within the rectangular contour of the engaged strips which permit limited spreading of the hooks without jamming thereof on the underfaces of the slider wings.

IRA SHUR.

References Cited in the file of this patent

UNITED STATES PATENTS

| Number | Name | Date |
|---|---|---|
| 1,959,319 | Sipe | May 15, 1934 |

FOREIGN PATENTS

| Number | Country | Date |
|---|---|---|
| 200,985 | Switzerland | Mar. 1, 1939 |
| 241,887 | Switzerland | Aug. 16, 1946 |